(12) United States Patent
Townsend, III et al.

(10) Patent No.: US 8,503,634 B1
(45) Date of Patent: Aug. 6, 2013

(54) SYSTEMS AND METHODS FOR TREATMENT OF INACTIVE ACCOUNTS

(75) Inventors: John Vincent Townsend, III, Kernersville, NC (US); Wasif Jalil Qureshi, Greensboro, NC (US); Charles David Orr, Burlington, NC (US)

(73) Assignee: Confinement Telephony Technology LLC, Greensboro, NC (US)

( * ) Notice: Subject to any disclaimer, the term of this patent is extended or adjusted under 35 U.S.C. 154(b) by 2 days.

(21) Appl. No.: 13/284,192

(22) Filed: Oct. 28, 2011

Related U.S. Application Data

(60) Provisional application No. 61/407,575, filed on Oct. 28, 2010.

(51) Int. Cl.
*H04M 15/00* (2006.01)
*H04M 17/00* (2006.01)
(52) U.S. Cl.
USPC .............. 379/114.2; 379/114.04; 379/114.17; 379/145

(58) Field of Classification Search
USPC .................. 379/111, 112.01, 114.01, 114.04, 379/114.14, 114.17, 114.2, 127.03, 144.01, 379/144.06, 145; 705/30, 33, 39, 40
See application file for complete search history.

(56) References Cited

U.S. PATENT DOCUMENTS

2003/0229585 A1* 12/2003 Butler .............................. 705/39
2007/0088667 A1* 4/2007 Schwarz et al. .................. 707/1
2011/0238577 A1* 9/2011 Shuster ........................... 705/44

* cited by examiner

*Primary Examiner* — Binh Tieu
(74) *Attorney, Agent, or Firm* — Kilpatrick Townsend & Stockton LLP

(57) ABSTRACT

Methods and systems for treating inactive accounts by designating certain accounts for either unclaimed or escheats treatment are presented. In the unclaimed treatment the remaining balance of funds associated with the account is assigned to a prepaid phone card, whereas in the escheats treatment the remaining balance of funds is remitted to an appropriate authority. In each case the account is declared inactive, and processes are made available to reactivate the account.

9 Claims, 11 Drawing Sheets

SYSTEMS AND METHODS FOR TREATMENT OF INACTIVE ACCOUNTS

RELATED APPLICATIONS

This application claims the benefit of U.S. Provisional Application No. 61/407,575 filed on Oct. 28, 2010, which is incorporated herein by reference.

FIELD OF THE INVENTION

The present invention relates to the treatment, disposition and restoration of customer account balances that have remained dormant for a period of time. More particularly, the present invention relates to the treatment, disposition and restoration of such accounts as they are encountered in telecommunications billing systems. Still more particularly, the present invention relates to such accounts as they are encountered in the business of providing inmate telecommunication services.

BACKGROUND OF THE INVENTION

Appropriate treatment, disposition—and occasionally, restoration—of telephone billing accounts which have gone dormant has long been a source of frequent error, confusion, and perceived inequity on behalf of both the telecommunications provider and the customer. In addition to concerns of business ethics and customer satisfaction, telecommunications providers are also faced with issues regarding contractual obligations, compliance, and reporting in accordance with various legal requirements, such as those governing appropriate treatment and remittance of Escheats.

Within the context of inmate telecommunication services, the profile of the issue is raised even higher than would ordinarily be the case, owing to the fact that accounts are typically only used during a period of time when a person known to the account holder customer is incarcerated, and further due to the fact that these persons frequently face periods of incarceration, followed by periods of non-incarceration, followed by a subsequent return to incarceration. Therefore, it is not uncommon for an account to remain dormant for a period of one or more years, only to return to an active state at some later point in time.

Because balances attributed to the customer account may only be used for the particular inmate telecommunications services offered by the telecommunications provider, it is quite common for accounts that go dormant to still have a viable—but effectively, unusable—balance of funds in the account. When the known inmate is no longer incarcerated, the telecommunications provider typically offers no services for which the account balance may be used. Therefore, the telecommunications provider holds the remaining accounting balance during the period of inactivity, unless the customer is sufficiently astute to recognize the outstanding balance and request a refund.

Adding a further layer of complication to the proper handling of such accounts is the fact that the rate at which Local Exchange Carriers (LECs) and wireless carriers re-issue inactivated telephone numbers to subsequent, unrelated parties has increased dramatically in recent years. An example of the complicating effect of a re-issued phone number can be seen in the inmate telecommunications business, where an account with an available balance of funds becomes dormant, and the telecommunications provider subsequently re-issues the phone number to a new party after, for example, 6 months. In this example, the new, unrelated party may now have access to the prior party's remaining balance of funds simply by an inmate placing a collect call to the number. Should the original party then come forward at some later point in time to request a refund, or should the telecommunications service provider remit the account balance to the state under Escheats law, for example, the balance may have already been consumed by the second party and therefore be unrecoverable. This issue is particularly prevalent in the case of prepaid cell phones, as these numbers have a very high "rate of churn", and are also quite popular for use by inmate families and friends.

Historically, providers of inmate telecommunications services have had no consistent, systematic, or automated method of dealing with these issues. Commonly, unused account balances are simply absorbed by the service provider, despite various regulatory or contractual mandates requiring some more equitable form of treatment. Furthermore, in the case of a prior account owner's account balances being subsequently consumed by a second holder of the same phone number, the prior account owner's funds are typically deemed as non-refundable. The need to provide a more equitable solution, while still maintaining a high level of efficiency and cost-effectiveness, therefore, makes it highly desirable to develop and utilize an automated system capable of tracking, classifying, treating, and occasionally reactivating such accounts.

SUMMARY OF THE INVENTION

The limitations of the prior art are overcome and a technical advance is made in accordance with the present subject matter, embodiments of which are presented in the following detailed description.

In accordance with one aspect of illustrative embodiments, proper treatment of dormant accounts is accomplished in an inmate telecommunications context by an automated computer software system that is integrated at multiple levels with the operation and provision of the telecommunication and billing services.

In some embodiments, an automated software system makes use of various modules, some of which operate independently, and some of which advantageously integrate with existing systems thereby achieving maximum efficiency and transparency.

In some embodiments, a Main Treatment Process module executes at specific periodic intervals to scan customer accounts and determine which accounts have become dormant, as well as determine and execute appropriate treatment action for each account, as specified by a pre-defined set of parameters governing treatment actions. The two primary treatment actions utilized are remittance of the account balance to the appropriate authority under Escheats law, and transfer of the balance on the account to a prepaid phone card that may be used from any location. In either case, the account is marked as Inactive and subsequent collect calls may not be received without some other action being first taken. In addition, in accordance with certain embodiments, the balance of an inactive account can be transferred to an active account associated with either the inactive account or the owner of the inactive account.

In some embodiments, a set of Real-time Validation Processes is used to integrate with live call processing, and provide appropriate handling of accounts that have already fallen under some form of treatment.

In some embodiments, a set of Accounting Batch Processes is used to integrate the treatment actions with the corporate accounting system, providing financial transaction level information and tracking.

In some embodiments, a set of Outbound IVR Notification Call Processes is utilized to place calls to the customers, notifying them of treatment status and actions already or about to be taken, providing information regarding the appropriate action to be taken by the customer, and providing a means for updating their current address.

In some embodiments, processes for a Web-based Application For Inactive Accounts Pending Treatment Action are provided, which are used to provide information to customers regarding treatment status and actions already or about to be taken, providing information regarding the appropriate action to be taken by the customer, and providing a means for updating their current address.

In some embodiments, processes for a Web-based Application For Accounts Other Than Inactive, Pending Treatment Action are provided, which give the customer the ability to log in and obtain information regarding the status and treatment actions affecting the account, as well as to request re-activation in the case of an inactivated account.

In some embodiments, processes governing Payment Receipt Processing are also provided, which serve to guarantee the appropriate handling, crediting of funds, and potential reactivation of an account when a payment is received.

In some embodiments, a set of processes governing Customer Service Call Handling is also provided. These processes integrate with the Customer Relationship Management ("CRM") software to govern appropriate handling by Customer Service Representatives (CSRs) and to provide relevant information regarding all accounts, as well as to provide a means for re-activating Inactive accounts.

In some embodiments, a set of processes governing Automated Inbound IVR Call Handling is also provided. These processes perform the appropriate call handling functions when customer calls are serviced by the automated phone system by providing relevant information regarding status and treatment of accounts, as well as providing a means for updating current address and/or re-activating an account.

In some embodiments, the modules and processes summarized above combine and integrate to have the effect of 1) scanning the customer records for accounts that are due for treatment, 2) determining which accounts are eligible for universally-usable prepaid cards and transferring the balance to, printing, and activating the prepaid cards (e.g., transferring balances to prepaid phone cards or debit cards that are usable in contexts outside of the inmate telecommunication services or otherwise usable outside of any other limited context with respect to which use of an account itself is limited), 3) determining which accounts have amounts that are too small to be considered for phone cards and then zeroing the balance, inactivating the account, and submitting the amount to Escheats when an appropriate time threshold has been met, and 4) for determining accounts for which no address can be found and scheduling/placing an IVR phone call to the customer to notify them and attempt to collect the updated address. Further, in some embodiments, the processes also provide for appropriate payment handling, live call placement handling, Customer Service interaction, and automated IVR Customer Service interaction, as well as web-based Customer Service applications for accounts with or without pending inactivity treatment actions.

These illustrative embodiments are mentioned not to limit or define the limits of the present subject matter, but to provide examples to aid understanding hereof. Illustrative embodiments are discussed in the Detailed Description, and further description is provided there. Advantages offered by the various embodiments may be further understood by examining this specification and/or by practicing one or more embodiments of the claimed subject matter.

BRIEF DESCRIPTION OF THE DRAWINGS

These and other advantages of illustrative embodiments of the present invention will be apparent to those skilled in the art by reference to the following detailed description and the accompanying drawing figures, in which.

DETAILED DESCRIPTION

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

Figure 1:
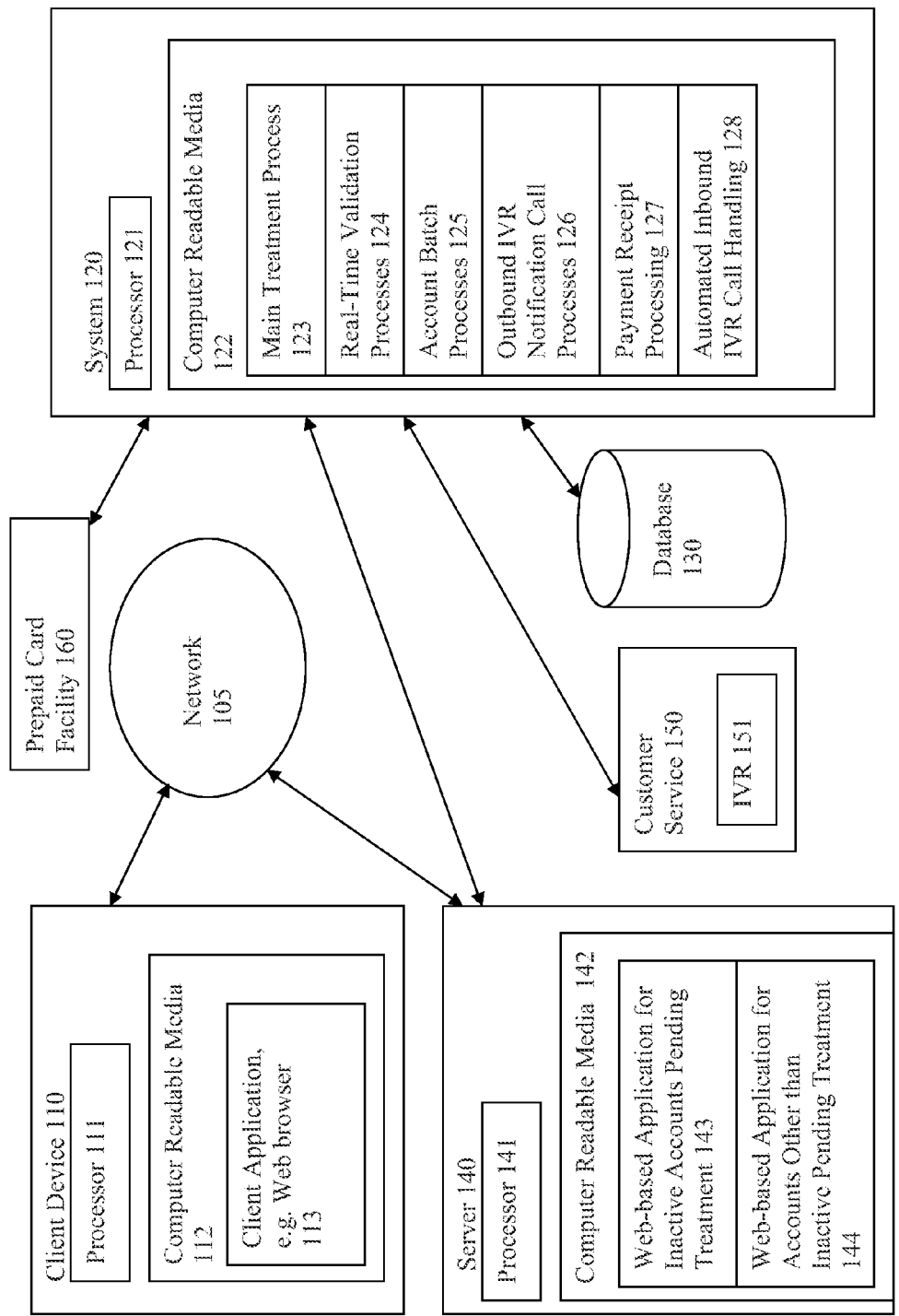
FIG. 1 illustrates an exemplary system in certain embodiments.

An exemplary embodiment provides for the appropriate treatment, disposition, and when appropriate restoration of telecommunications billing accounts that have gone dormant by automatically scanning customer accounts to identify dormant accounts and executing appropriate treatment actions in accordance with pre-defined parameters. FIG. 1 illustrates an exemplary system comprising a main system 120 with a processor 121 and computer readable media and storage capabilities 122. Stored within this main system is appropriate hardware, firmware, and/or software for implementing a main treatment process module 123, real-time validation process module 124, account batch process module 125 outbound interactive voice recording ("IVR") call notification process module 126, payment receipt processing module 127, and automated inbound IVR call handling module 128. Coupled to the main system 120 is a database 130 comprising customer account records. Also coupled to the main system 120 is a server 140 comprising a processor 141 and computer readable media and storage capabilities 142, which include a module to support web-based application for inactive accounts pending treatment 143 and a module to support web-based application for accounts other than inactive pending treatment 144. Server 140 is accessible by a client device 110 across a network 105 such as the Internet. Client device 110 comprises a processor 111 as well as computer readable media and storage capabilities 112 with client applications such as a web browser 113. The main system 120 is also coupled to a prepaid card facility for preparing and generating prepaid phone cards.

Applications and other electronic content execute or are otherwise used on the exemplary computer devices 110, 120, and 140 and are shown as functional components or modules. As is known to one of skill in the art, such applications and content may be resident in any suitable computer-readable medium and execute on any suitable processor. For example, as shown the client device 120 comprises a computer-readable medium such as a random access memory (RAM) 122 coupled to a processor 121 that executes computer-executable program instructions and/or accesses information stored in memory (not shown). Such a processor 121 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The client device 110 may also comprise a number of external or internal devices such as a mouse, a CD-ROM, DVD, a keyboard, a display, audio speakers, one or more microphones, or any other input or output devices. Device 110 could be a personal computing device, a mobile device, or any other type of electronic devices appropriate for providing one or more of the features described herein.

The modules operating on system 120 are described in further detail below.

Main Treatment Process

Figure 2:
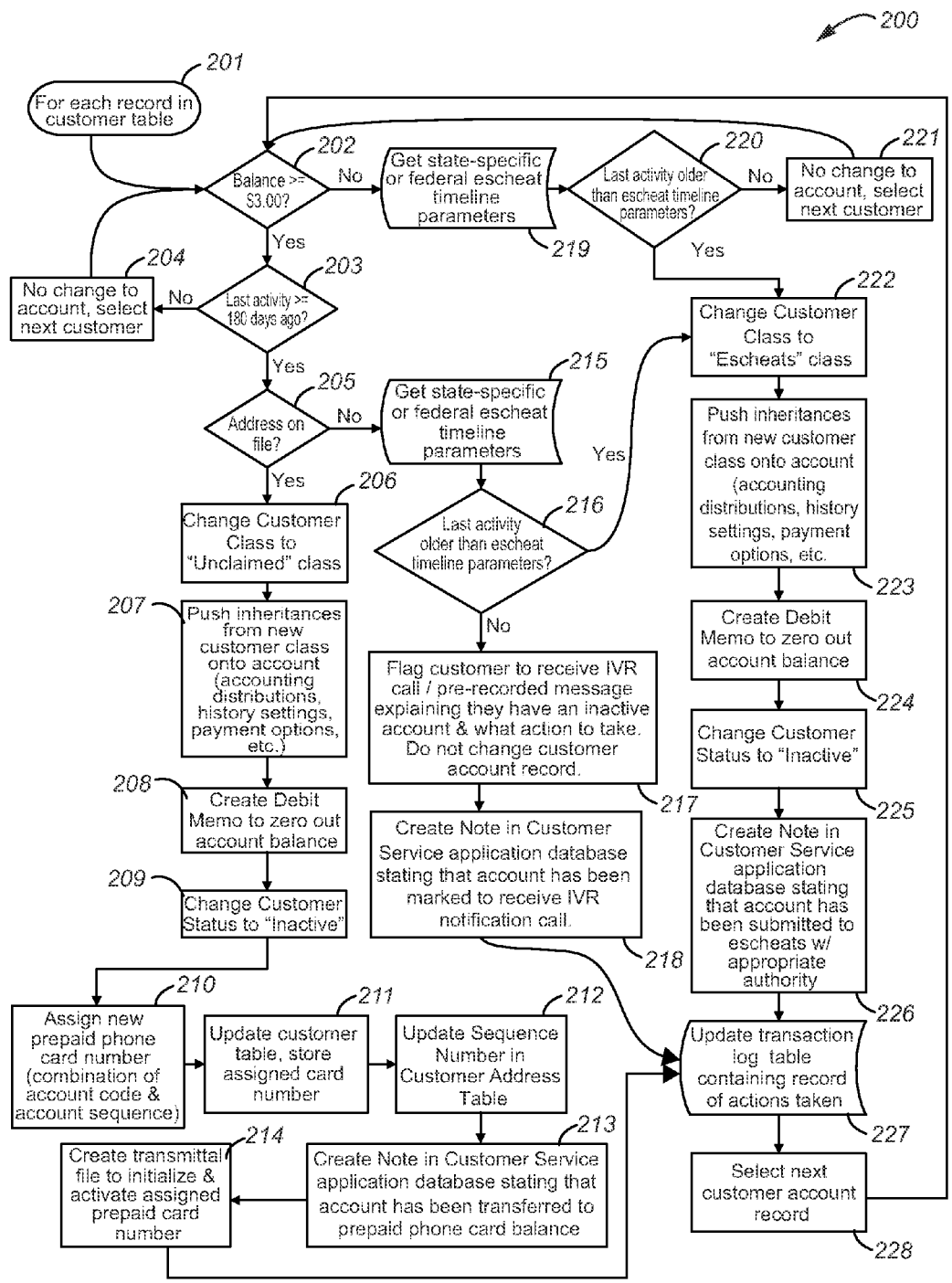
FIG. 2 is a flowchart illustrating functions performed by a Main Treatment Process Module according to certain embodiments.

FIG. 2 illustrates processes performed by a Main Treatment Process Module 200 according to certain embodiments. The process begins at box 201 where a customer record is accessed. In accessing customer records, the process can exclude certain records based, for example, on customer class, customers receiving calls from a designated facility, etc. As shown in decision box 202, a variable balance threshold may be used, which is illustratively shown as $3.00. If at decision box 202 the balance is greater than the given threshold, the processing continues to decision box 203 where an inactivity threshold is checked. In FIG. 2 this variable time frame of specified inactivity is shown as 180 days. If the account has not been inactive for a sufficient period of time, then at box 204 the process makes no change to the customer account and proceeds to the next customer account. If the account has been inactive for a sufficient period of time, the process then proceeds to decision box 205 where a check to ascertain if a customer address for this account is on file. In addition, this check can also include tests to determine if the address on file is valid, for example by checking for a valid zip code or checking that numbers and characters are in the expected sequence. If a valid address is on file, then the process changes the Customer Class to "Unclaimed" at box 206 and pushes various inheritances from this new customer class onto the account at box 207. At box 208, the process creates a Debit Memo to zero out the account balance and changes the Customer Status to "Inactive" at box 209.

Also shown in FIG. 2 at box 210, a new prepaid card number is then assigned. The assigned prepaid phone card number is comprised of a combination of the account code (phone number), preceded by an account sequence number, which is iterated with each new occurrence of a customer in possession of this phone number. This feature guarantees uniqueness of the card number, and also facilitates the ability to store and track multiple customers per phone number—each carrying their own account sequence code. The customer table is updated at box 211 to store the new assigned prepaid card number, and the sequence number is updated in the customer address table at box 212.

At box 213 the account is notated to indicate that it has been transferred to prepaid phone card service, and at box 214 the process transmits a card initialization file to the process by which the prepaid card is created. The modularity of the process enables switching between different $3^{rd}$ party phone card providers or use of an in-house phone card simply by changing the step to create and transmit the card initialization file at box 214. The process then updates a transaction log table to record actions taken with respect to this account at box 227 and then selects the next account for processing at box 228.

Returning to decision box 205, if the account does not have an address on file, then the process retrieves the appropriate state-specific or federal escheat timeline parameters at box 215 and asks whether the date of the last activity in the account exceeds the escheat timeline parameters at box 216. As shown in FIG. 2, escheat timeline parameters may be varied using pre-defined values assigned to specific states or may be specified at a default level. This feature provides for flexibility in maintaining compliance with regulatory requirements. If the last activity on the account is not older than the escheat timeline parameters, then at box 217 the process flags the account for an IVR call to be made to the customer's phone number. At box 218 the process notates the account to show that it has been flagged for an IVR call notifications, and the process then moves to box 227 (already discussed above) for continued processing.

Returning to decision box 202, is the balance is less than the given threshold, then at box 219 the process retrieves state-specific or federal escheat timeline parameters and compares the date of the last activity on the account to these timeline parameters at box 220 (these actions are analogous to the actions discussed above in connection with boxes 215 and 216). If the last activity on the account is not older than the escheat timeline parameters, then at box 221 the process makes no change to the customer account and proceeds to the next customer account. This escheats process need not be run at each execution of the main treatment module but may instead be run on a scheduled basis, for example one time a year.

If at box 216 or at box 220, the last activity on the account is older than the escheat timeline parameters, then the process continues (in either case) to box 222 where the process changes the Customer Class to "Escheats" and at box 223 pushes various inheritances from this new customer class onto the account. At box 224, the process creates a Debit Memo to zero out the account balance and changes the Customer Status to "Inactive" at box 225. At box 226 the account is notated to indicate that it has been transferred to escheats with the appropriate authority, and the process then updates a transaction log table to record actions taken with respect to this account at box 227 and then selects the next account for processing at box 228. The log of actions taken can include, as appropriate, date of inactivation, account balance, account number, new class, debit memo number, address, card print date, and any other information of interest in the transaction log.

Also illustrated in FIG. 2 is the principle roles for which the Customer Class and Customer Active/Inactive status indicators are used. The Customer Class may be set to indicate that the account has been remitted to Escheats, that it is "Unclaimed", and therefore converted to prepaid card format, or that it is neither of the aforementioned, indicating that it is a "normal" account. Furthermore, the Active/Inactive status indicator is used to designate accounts that are currently able to receive calls. Once an account has been reclassified as Escheats or Unclaimed, it is also marked Inactive and is no longer eligible to receive calls until some subsequent action is taken.

In an alternative embodiment, the process can identify one or more accounts associated with the inactive account and can query the customer account records for those accounts to ascertain if any of the associated accounts is an active account. Accounts may be associated, for example, because they are owned by or otherwise assigned to the same customer. Upon identification of an associated active account, the process can then transfer the balance of the inactive account to the active account. Implementing such functionality may involve modifying one or more of the features of the exemplary embodiments disclosed herein.

Accounting Batch Process

Figure 3:
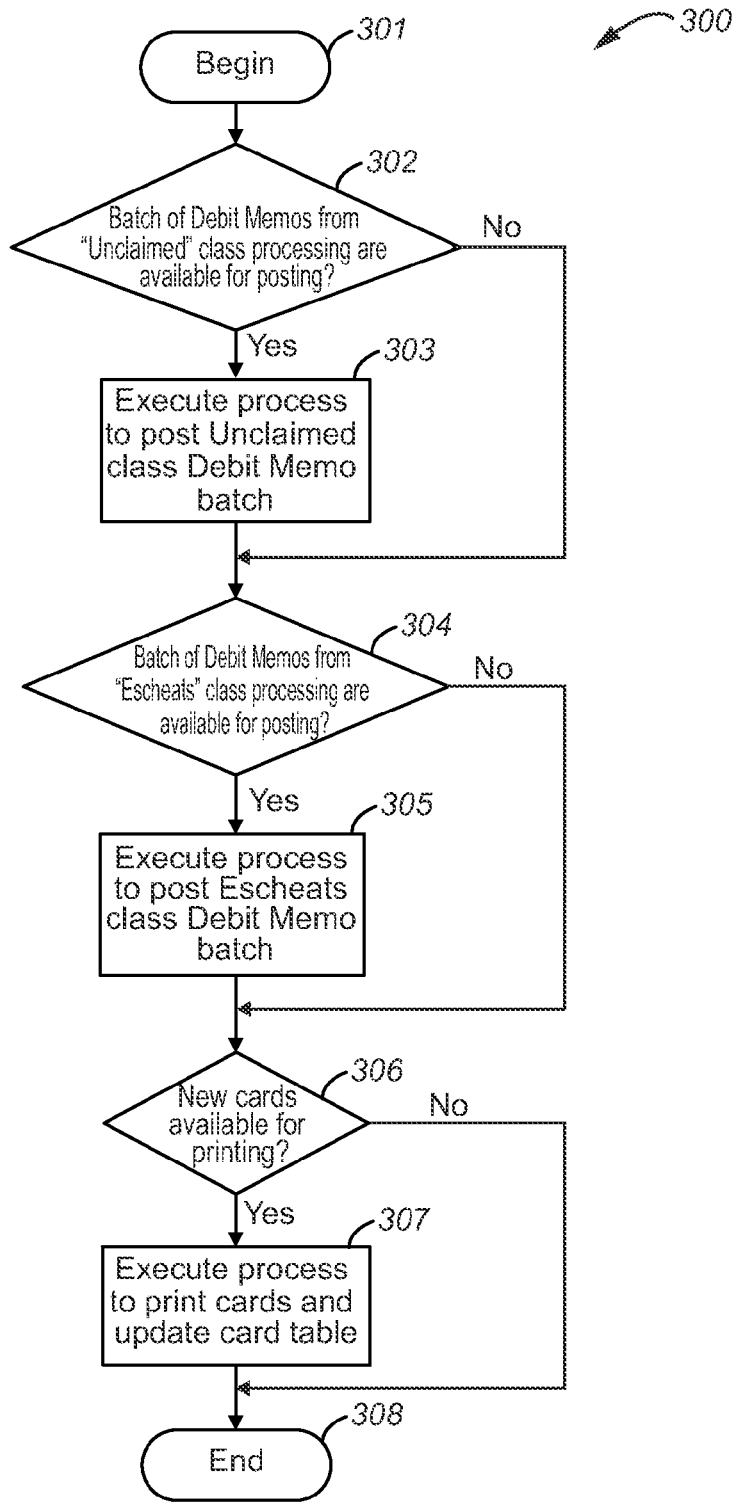
FIG. 3 is a flowchart illustrating methods performed by an Accounting Batch Processes Module according to certain embodiments.

FIG. 3 illustrates the processes performed by the Accounting Batch Module 300 in certain embodiments. The process begins at box 301 and checks at decision box 302 to see if a batch of Debit Memos from the "Unclaimed" class are ready for posting. If not, then the process jumps to box 304. If so, then at box 303 the process executes processes for the available batch of Debit Memos for the Unclaimed class to post Debit Memos to treated accounts for the purpose of zeroing out the account balance and completing the financial accounting record. The process then proceeds to decision box 304 where it checks to see if a batch of Debit Memos from the "Escheats" class is available for posting. If not, then the process jumps to box 306. If so, then at box 305 the process executes processes for the available batch of Debit Memos for the Escheats class to post Debit Memos to treated accounts for the purpose of zeroing out the account balance and completing the financial accounting record. The process then proceeds to box 306 where it checks to see if prepaid cards have been assigned for preparation and printing. If not, then the process ends at box 308. If so, at box 307 the process executes processes to print cards and update the appropriate card table. Functions are provided for printing numbered prepaid phone cards incorporated into a pre-printed layout with the specific customer name and address printed on each form by the provided printing process and then mailed to the appropriate customer.

In an alternative embodiment, the module described in FIG. 3 may be modified to eliminate boxes 302 and 304 through the use of autoposting to eliminate waiting to post the Debit Memos in batches. Implementing such functionality may involve modifying one or more of the features of the exemplary embodiments disclosed herein.

In yet another embodiment, the module described in FIG. 3 may be modified to provide for and execute processes to transfer an available balance from an inactive account to an associated active account. Implementing such functionality may involve modifying one or more of the features of the exemplary embodiments disclosed herein.

Real-Time Account Validation Process

Figure 4:
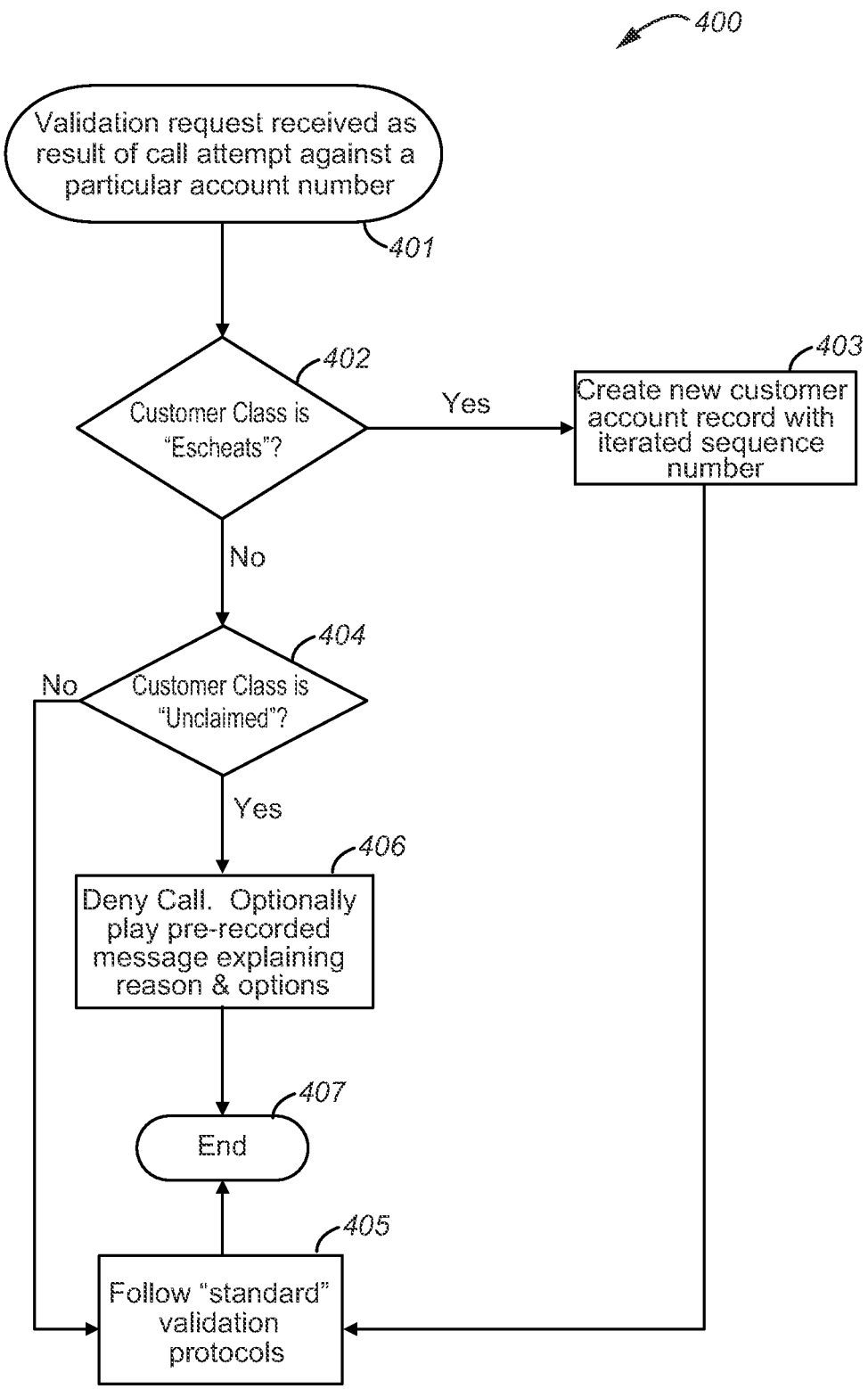
FIG. 4 is a flowchart illustrating functions performed by a Real-Time Validation Module according to certain embodiments.

FIG. 4 illustrates the processes performed by the Real-Time Account Validation Module 400 according to certain embodiments. The process begins at box 401 when a validation request arises due to a call attempt against an account number. At decision box 402 the process checks to see if the Customer Class for the account is "Escheats." If so, the process iterates the sequence number and creates a new customer account record with this iterated number. It then proceeds to box 405, where standard validation protocols are implemented and the process then ends at box 407. If the Customer Class is not "Escheats" at box 402, the process proceeds to decision box 404 to check to see if the Customer Class is "Unclaimed." If not the process proceeds to the standard validation protocols at box 405. If the Customer Class is "Unclaimed" then at box 406 the process denies the call. In addition, the process can optionally play a pre-recorded message explaining the reason for denial and offering the caller further options. The process then ends at box 407. As shown in this illustrative embodiment, special treatment is provided for customers whose Customer Class is found to be "Escheats" or "Unclaimed", although other classes could be added as well, each containing their own specialized treatment.

In an alternative embodiment, the module described in FIG. 4 can be modified to examine the Customer Status immediately after box 401. If Customer Status is "Inactive," the alternative embodiment proceeds to box 403 and otherwise proceeds directly to box 405. As such, the alternative embodiment does not implement boxes 402, 404, or 406 of FIG. 4. Implementing such functionality may involve modifying one or more of the features of the exemplary embodiments disclosed herein.

Outbound IVR Call Process

Figure 5:
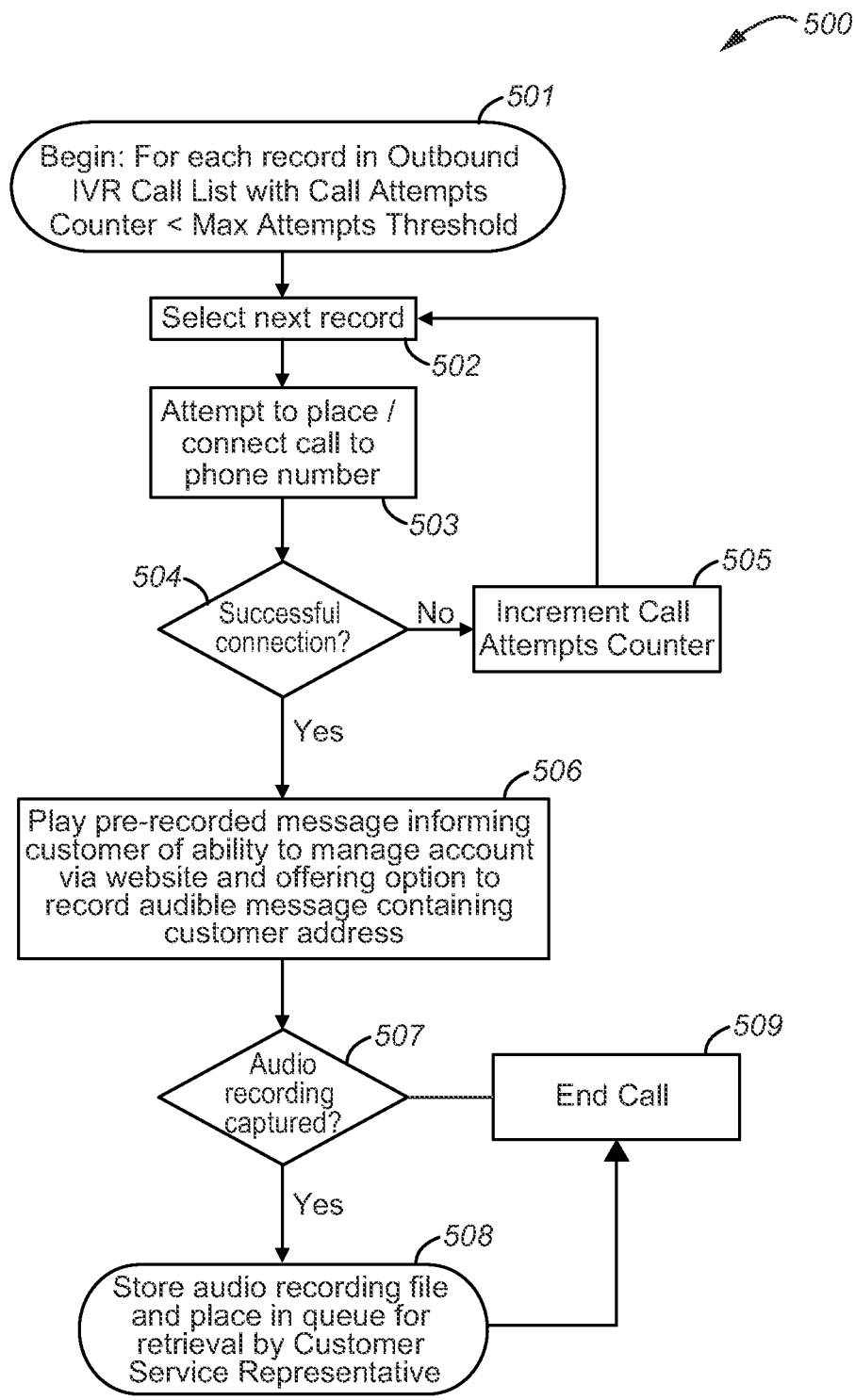
FIG. 5 is a flowchart illustrating functions performed by an Outbound IVR Notification Call Module according to certain embodiments.

FIG. 5 illustrates the processes performed by the Outbound IVR Notification Call Module 500 in certain embodiments. The process begins at box 501 and assembles an Outbound IVR Call List of records where the number of attempts already made does not exceed a maximum call attempts threshold. A variable number of maximum call attempts may be utilized. At box 502 the process selects a record from this list for processing and tries to place an IVR call to a phone number associated with the record at box 503. If at decision box 504 the connection attempt is unsuccessful, the process then increments a call attempts counter for that record at box 505 and proceeds to select another record at box 502. If a connection is successfully established, then at box 506 the process plays an IVR message to inform the customer of various things such as the ability to manage his account via a website. It also gives the customer the option to leave a message to provide information such as the customer's address. If at decision box 507 an audio recording is captured then at box 508 the process stores this recording in an audio file designed for playback and transcription by a Customer Service Representative. The process then ends at box 509. Additionally, though not illustrated here, the Outbound IVR Notification Call Module could easily be configured to utilize Speech-to-Text technology to capture the address information and automate the transcription process.

In an alternative embodiment, box 505 of FIG. 5 can be eliminated and the process can continue making call attempts, either immediately or at later times, until a connection is successfully established. In yet another embodiment, the process can also maintain a list of numbers that are not to be called, whether as a result of a customer request to be put on a do not call list, or because the process has encountered certain errors in trying to achieve a connection, or any other reason. Implementing such functionality may involve modifying one or more of the features of the exemplary embodiments disclosed herein.

Web-Based Application for Inactive Accounts Pending Treatment Action Process

Figure 6A:
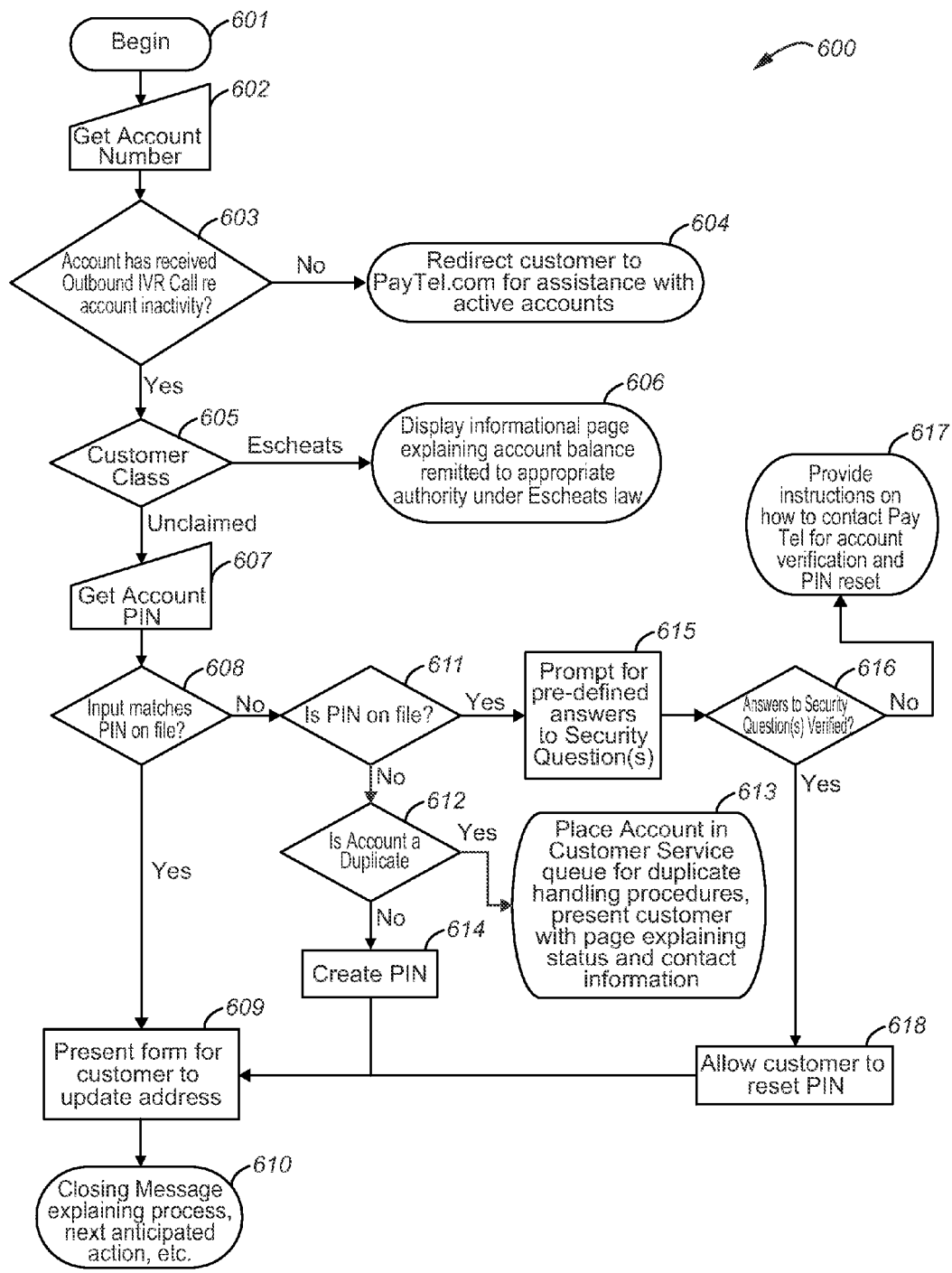
FIG. 6a is a flowchart illustrating functions performed by a Web-based Application For Inactive Accounts Pending Treatment Action according to certain embodiments.

FIG. 6a illustrates the processes performed by Web-based Application For Inactive Accounts Pending Treatment Action Module 600 in certain embodiments. This module provides a universally-accessible website for use by customers who have received an outbound IVR Notification Call as outlined in FIG. 5. These customers are presented with specific information regarding the current status of their account and informed of any action they may wish to take, as well as offering an opportunity to update their address information, the lack of which was the trigger for the call they received. Controls are provided to ensure verification of the account, using PINS and Security Questions. Customers who have not received the IVR Notification Call as described in FIG. 5 will be automatically redirected to the main website, as there will be no relevant information for them on this website.

The processes of module 600 according to certain embodiments as illustrated in FIG. 6a begins at box 601 when a customer accesses a web site and obtains the account number at box 602. If at decision box 603 the account has not received an outbound IVR Notification Call regarding account activity the customer is redirected to a different web site at box 604. Otherwise the process ascertains the Customer Class for the account at decision box 605. If the Customer Class is Escheats, then at box 606 the process causes the web site to present information explaining that the account balance has been remitted to the appropriate authority in accordance with escheats legal provisions. Otherwise if the Customer Class is Unclaimed then the process obtains an account personal identification number ("PIN") at box 607 and at decision box 608 determines if the account PIN matches the PIN on file for this account. If the account PIN matches a PIN on file then at box 609 the process presents a form to the customer to update address information and proceeds to a closing message at box 610. If the account PIN does not match a PIN on file, the process determines at decision box 611 whether there is a PIN no file for this account. If not, then the process proceeds to decision box 612 where it determines whether the account is a duplicate account and, if so, places it in a customer service queue and presents information to the customer explaining status and providing contact information at box 613. If at decision box 612 the account is not a duplicate account, the process creates a PIN at box 614 and then proceeds to box 609 for subsequent processing as described above. Returning to decision box 611, if there is a PIN on file for this account the process then proceeds to prompt the customer to answer one or more pre-defined security questions at box 615 and verifies the answers at decision box 616. If the answers are not veri-fied the process provides instructions and contact information to the customer at box 617 for account verification and PIN reset. If the security answers are verified at decision box 616, the process permits the customer to reset the PIN at box 618 and the proceeds to box 609 for subsequent processing as described above.

Figure 6B:
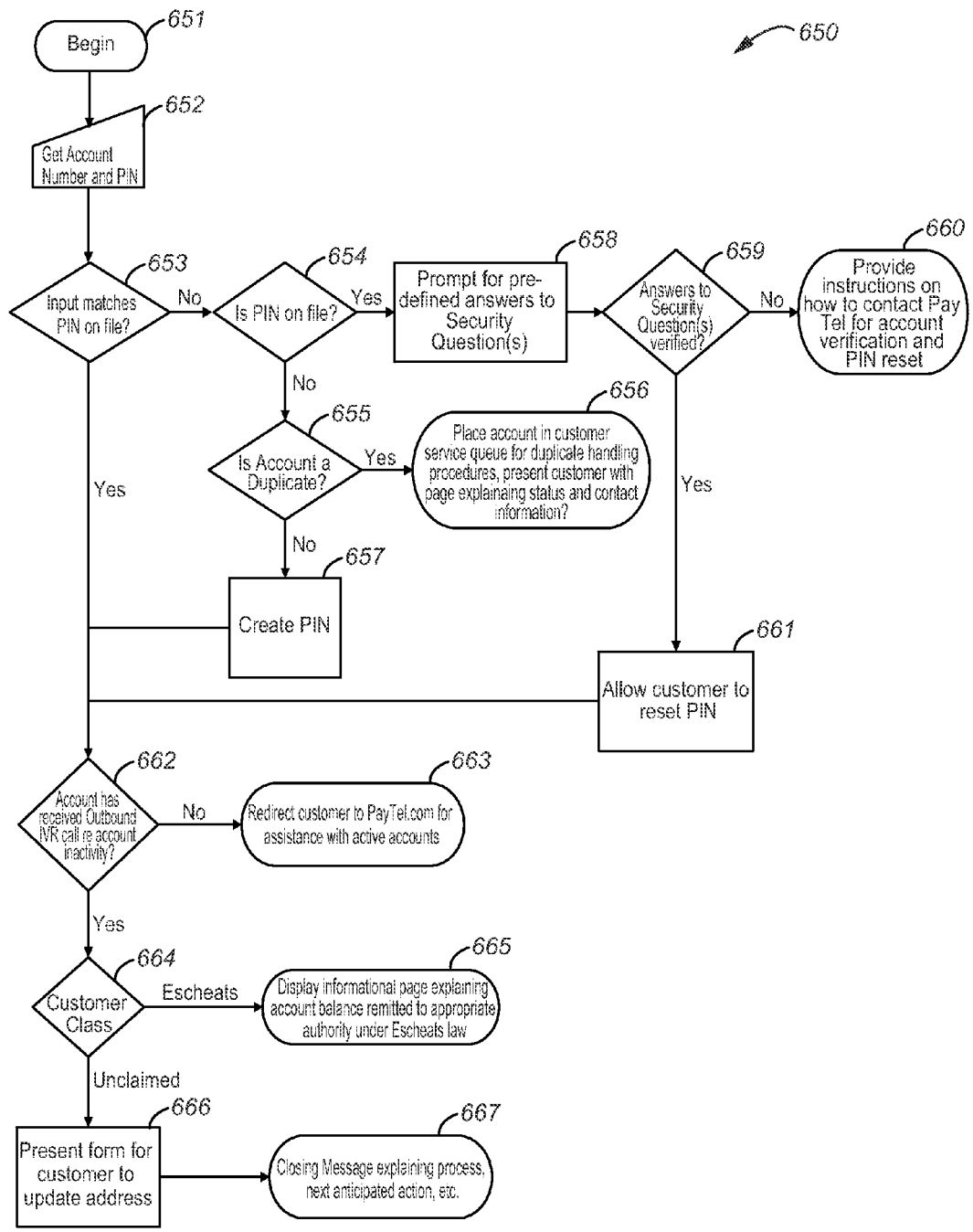
FIG. 6b is a flowchart illustrating functions performed by a Web-based Application For Inactive Accounts Pending Treatment Action according to certain embodiments.

FIG. 6b illustrates an alternative control flow for Web-based Application For Inactive Accounts Pending Treatment Action Module 650 according to certain embodiments. This alternative order of control may provide improved efficiency in some circumstances. The description of the process is analogous to the description provided above for the process described in FIG. 6b and hence is not repeated here.

Payment Receipt Process

Figure 7:
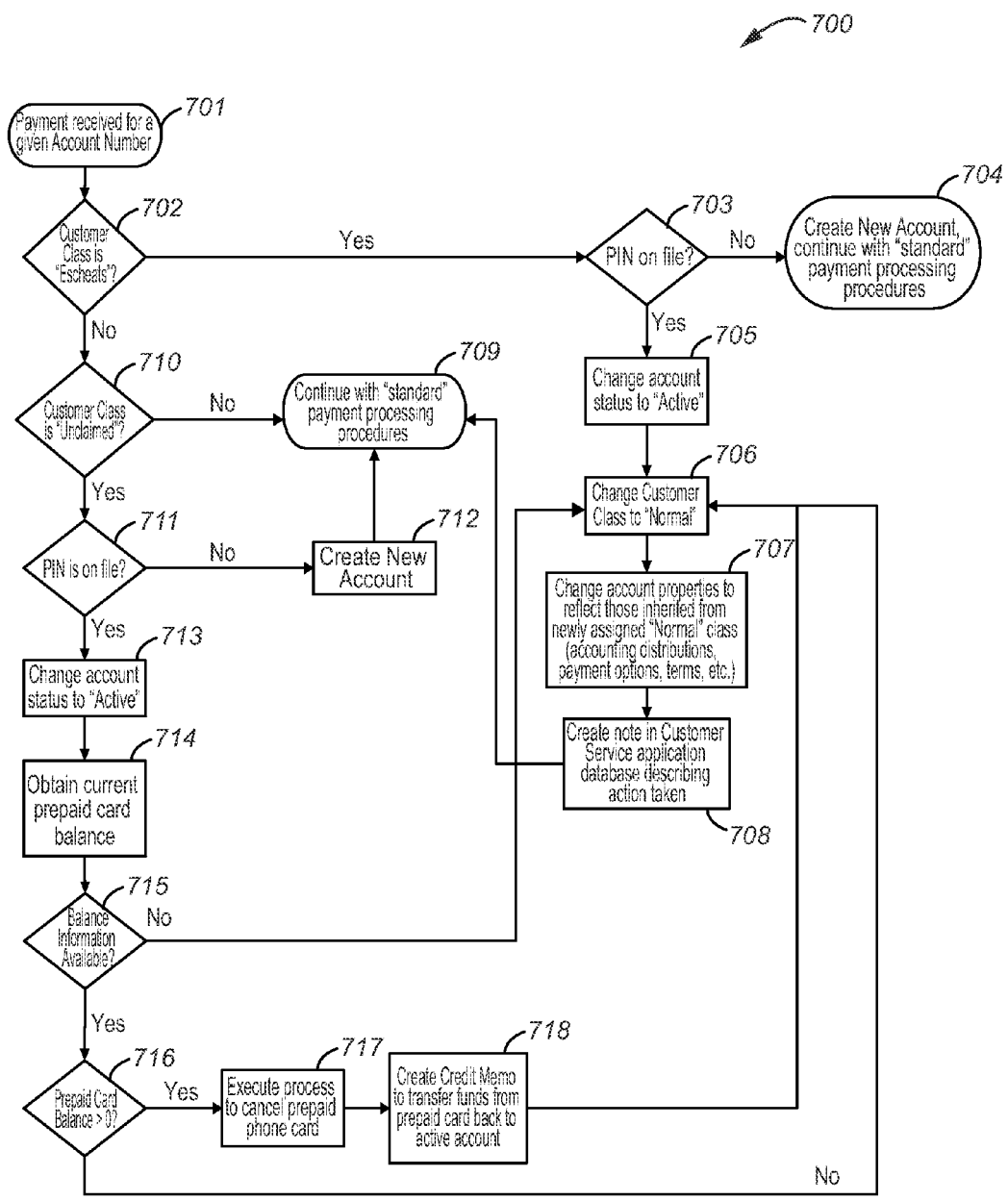
FIG. 7 is a flowchart illustrating functions performed by a Payment Receipt Processing module according to certain embodiments.

FIG. 7 illustrates the processes performed by the Payment Receipt Processing Module 700 according to certain embodiments. Special treatment is given to payments received on accounts which have been classified as Escheats or Unclaimed, and although not illustrated here, additional classes could also be added, each containing their own specialized treatment. This process also provides for the automated re-activation of inactivated accounts once a subsequent payment has been received, and also provides for the automated transfer of a balance back from a prepaid card onto the account. While not illustrated in FIG. 7, options to modify the criteria for re-activating an account and/or cancelling the prepaid card could easily be added or modified to accomplish a desired level of security.

The process begins at box 701 when a payment is received for an account number and checks at decision box 702 if the Customer Class is "Escheats." If so, it then proceeds to check at decision box 703 if a PIN is on file and, if not, proceeds to create a new account and implement standard payment processing at box 704. If the Customer Class is not "Escheats," the process the checks at decision box 710 to see if the Customer Class is "Unclaimed." If not, then the process continues with standard payment processing at box 709. If the Customer Class is "Unclaimed," then the process checks at decision box 711 to see if a PIN is on file and, if not, creates a new account at box 712 and proceeds to standard payment processing at box 709. Returning to decision box 711, if a PIN is on file then at box 713 the process changes the account status to "Active" and obtains the current prepaid card balance at box 714. If at decision box 715 the balance information is available and if at decision box 716 the prepaid card balance is greater than zero, then the process cancels the prepaid phone card at box 717, creates a Credit Memo at box 718 to transfer funds from the prepaid card back to the active account, and proceeds to box 706 where the Customer Class is changed to "Normal." At box 707 the process changes the account properties to reflect those properties of the newly assigned "Normal" class, logs the actions taken at box 708, and proceeds to standard payment processing at box 709. If at decision box 716 the prepaid card balance is zero, the process bypasses boxes 717 and 718 and proceeds directly to box 706. Returning to decision box 715, if no balance information is available, the process proceeds to box 706 for subsequent processing as described above. The decision that balance information is not available is not necessarily reached after only one attempt to obtain the balance information, as it may occur that balance information is not available due to a system failure rather than the account balance information not existing. Thus the process can make several attempts to obtain balance information before reaching the decision at box 715 that it is not available.

In alternative embodiment, if balance information is not available at decision box 715, the process proceeds to box 712 and subsequent processing to create a new account. In yet another embodiment, if Customer Class is "Unclaimed," or "Escheats" the process proceeds to create a new account rather than reactivating the account and also executes processes to obtain a balance remaining on a prepaid phone card, if any, cancel the prepaid phone card, and either refund the balance or transfer it to a new prepaid phone card with an account number generated in accordance with the account numbering scheme described above. Implementing such functionality may involve modifying one or more of the features of the exemplary embodiments disclosed herein.

Customer Service Process

Figure 8:
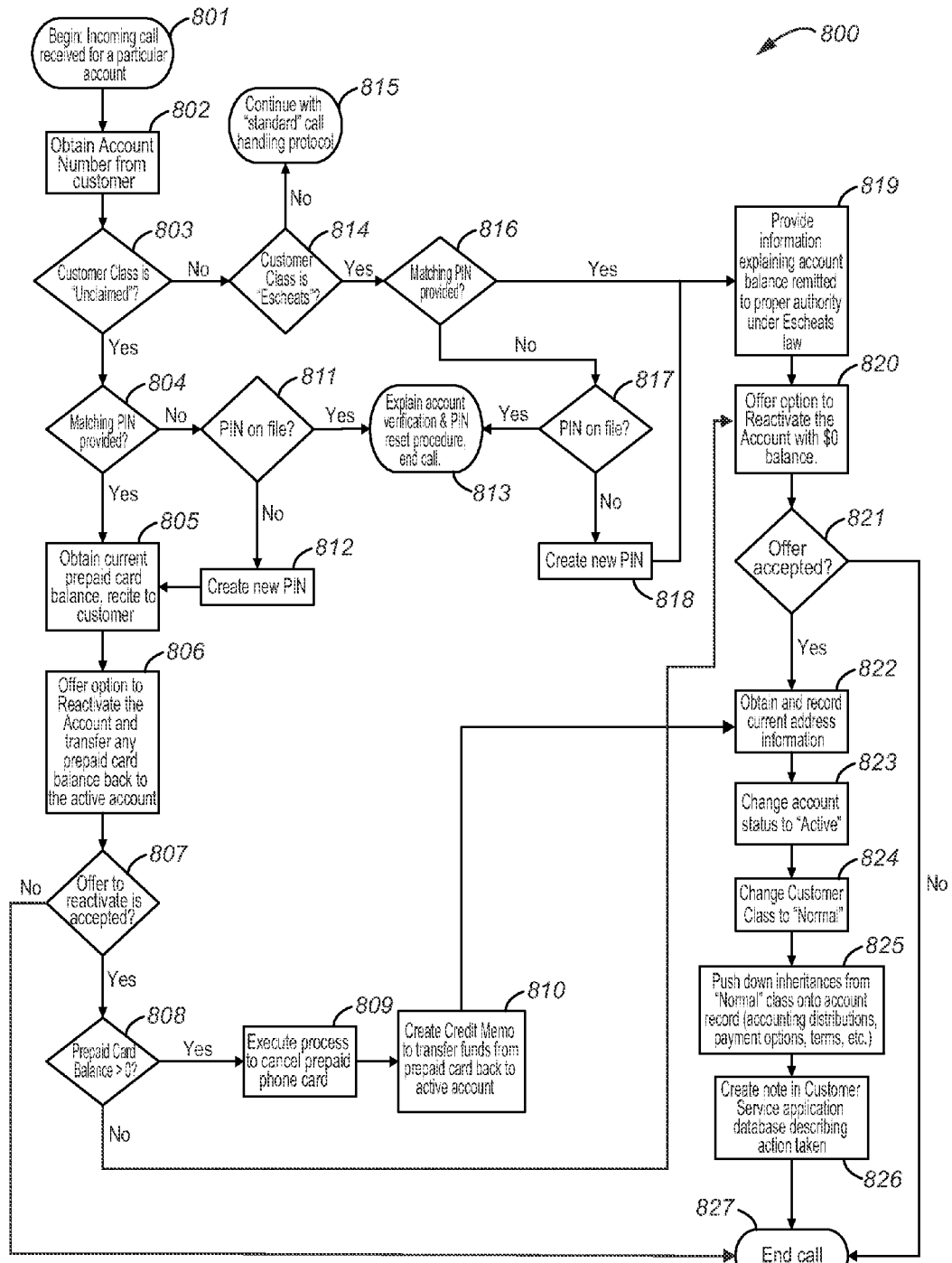
FIG. 8 is a flowchart illustrating functions performed by a Customer Service Module according to certain embodiments.

FIG. 8 illustrates functionality provided by the Customer Service Module 800 in certain embodiments. As with other modules in certain embodiments, customers are given specialized handling based on their Customer Class, and while not illustrated in this example, additional classes beyond those shown could easily be added.

The process according to some embodiments begins at box 801 when an incoming call is received for a particular account and an account number is obtained at box 802 from the caller. If at decision box 803 the Customer Class is "Unclaimed" then the process proceeds to decision box 804 to determine if a matching PIN is provided. If so, then at box 805 the current prepaid card balance is provided to the customer and at box 806 the customer is offered the option to reactivate the account and transfer the prepaid card balance back to the active account. As discussed previously with respect to FIG. 7, the process of obtaining the customer balance can be iterated until the balance is obtained since the balance may not be available on any given attempt due, for example, to a system failure. If during the call the balance is not available, the customer can be informed via an appropriate message (not shown) and the call ended. If at decision box 807 the customer declines to reactivate the account, the call ends at box 827. If the customer decides to reactivate the account, then the process determines if the prepaid card balance is greater than zero at decision box 808. If not, then the processing proceeds to box 820 as described further below. If the prepaid card balance is greater than zero, then at box 809 the prepaid card is canceled and at box 810 a Credit Memo is created to transfer the funds from the prepaid card back to the active account. The process then proceeds to obtain current address information at box 822, change the account status to "Active" at box 823, change Customer Class to "Normal" at box 824, push down inheritances from the Normal account onto the account record at box 825, log the actions taken at box 826, and end the call at box 827.

Returning to decision box 804, if no matching PIN is provided and no PIN is ascertained at decision box 811 to be on file, then the process creates a new PIN at box 812 and proceeds to box 805 and subsequent processing as described above. If at decision box 811 there is a PIN on file, then at box 813 the account verification procedure and PIN reset procedure is explained and the call is ended.

Returning to decision box 803, if the Customer Class is not "Unclaimed" and is determined at decision box 814 not to be "Escheats," then processing proceeds to standard call handling protocol at box 815. If at decision box 814 it is determined that the Customer Class is "Escheats but if at decision box 816 a matching PIN is not provided the process proceeds to decision box 817 to determine if a PIN is on file. If not, then at box 818 a new PIN is created and processing continues to box 819 to be described below. If at decision box 816 a matching PIN is provided, then processing proceeds to box 819 where the customer is provided with information explaining that the account balance was remitted to the proper authorities in accordance with escheats legal provisions. At box 820 the customer is then offered the option to reactivate the account with a zero balance. If at decision box 821 the customer declines the offer then the call ends at box 827. If the customer accepts the offer to reactivate the account with zero balance, then the processing proceeds to box 822 and subsequent processing as described above.

In an alternative embodiment, if Customer Class is "Unclaimed," or "Escheats" the process proceeds to offer to create a new account rather than reactivating the account and also executes processes to obtain a balance remaining on a prepaid phone card, if any, cancel the prepaid phone card, and either refund the balance or transfer it to a new prepaid phone card with an account number generated in accordance with the account numbering scheme described above. Implementing such functionality may involve modifying one or more of the features of the exemplary embodiments disclosed herein.

In yet another embodiment, if the account number obtained from the customer indicates an inactive account for which there is an associated active account. In this embodiment, processes giving the customer the option to transfer the remaining balance of the inactive account to the associated active account can be implemented. Implementing such functionality may involve modifying one or more of the features of the exemplary embodiments disclosed herein.

Automated Inbound IVR Phone System Process

Figure 9:
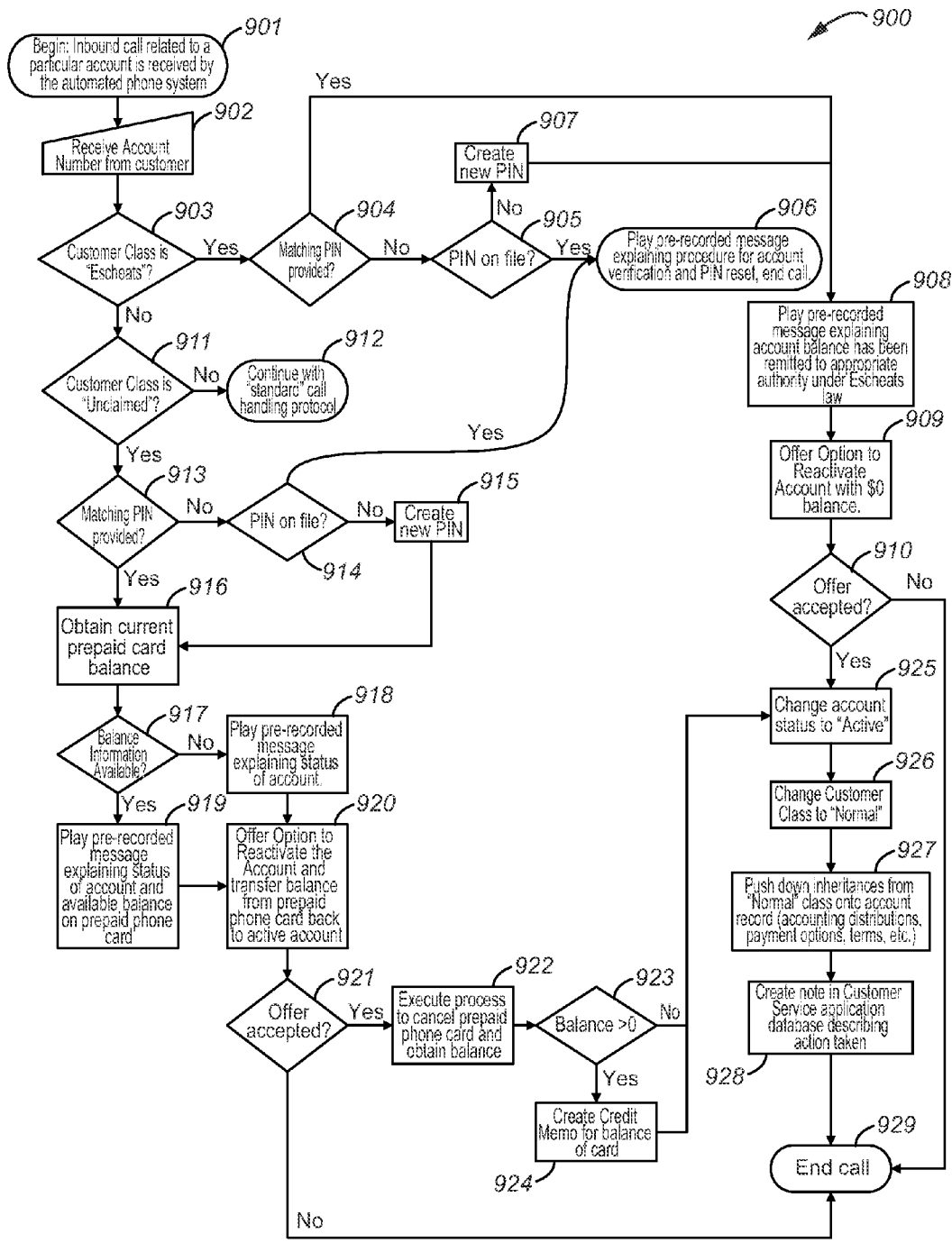
FIG. 9 is a flowchart illustrating functions performed by an Automated Inbound IVR Call Handling Module according to certain embodiments.

FIG. 9 illustrates the functionality provided by the Automated Inbound IVR Phone System Module 900 according to certain embodiments. Similarly to FIG. 8, customers are given specialized handling based on their Customer Class, and while not illustrated in this example, additional classes beyond those shown could easily be added. The process according to some embodiments begins at box 901 when an automated phone system receives an inbound call pertaining to an account. The process receives an account number from the customer at box 902 and determines at decision box 903 whether the Customer Class is "Escheats." If so and if a matching PIN is provided at decision box 904, then the process plays a pre-recorded message at box 908 explaining that the account balance has been remitted to the proper authority in accordance with escheats legal provisions. The process offers to reactivate the account with a zero balance at box 909. If the customer declines at decision box 910 then the call ends at box 929, but if the customer accepts then processing proceeds to box 925 to be described further below.

Returning to Decision box 904, if a matching PIN is not provided but a PIN is determined at decision box 905 to be on file, then a pre-recorded message explaining the procedure for account verification and PIN reset is played at box 906. If at decision box 905 a PIN is not on file, then a new PIN is created at box 907 and processing proceeds to box 908 as described above.

Returning to decision box 903, if the Customer Class is not "Escheats" then the process determines at decision box 911 if the Customer Class is "Unclaimed." If not, then processing continues with standard call handling protocol at box 912. If at decision box 911 the Customer Class is "Unclaimed," but at decision box 913 no matching PIN is provided, the process determines at decision box 914 is a PIN is on file. If so, processing proceeds to box 906 as described above. If at decision box 914 no PIN is on file then a new PIN is created at box 915 and processing proceeds to box 916 and subsequent processing to be described below.

Returning to decision box 913, if a matching PIN is provided, then at box 916 the process obtains the current prepaid card balance. As with FIGS. 7 and 8, the process of obtaining the balance can be iterated if the balance cannot be obtained on a given attempt due, for example, a system failure. If after a number of retries the account balance is not available due, for example, to a system failure, then the process plays an appropriate message (not shown) and the call ends. If no balance information is available at decision box 917, due, for example, to the nonexistence of such balance information for this customer record, then the process plays a pre-recorded message at box 918 explaining the status of the account and proceeds to box 920 and subsequent processing to be described below. If account balance information is available at decision box 918, then at box 919 a pre-recorded message is played to explain the status of the account and provide the available balance on the prepaid phone card. At box 920 the process then offers the customer the option to reactivate the account and transfer the balance from the prepaid card back to the active account or, if the balance it zero, to reactivate the account with zero balance. If this offer is not accepted at decision box 921, then the call ends at box 929. If at decision box 921 the offer is accepted, then at box 922 the process cancels the prepaid phone card. At decision box 923 if the balance is greater than zero, then at box 924 a Credit Memo for the balance of the card is created and processing proceeds to box 925. If at decision box 923 the balance is zero the process bypasses box 924 and proceeds to box 925, where the account status is changed to "Active." At box 926 the Customer Class is changed to "Normal," at box 927 the inheritances from the Normal class are pushed down to the account, at box 928 the actions taken are logged, and the call ends at box 929.

In an alternative embodiment, if Customer Class is "Unclaimed," or "Escheats" the process proceeds to offer to create a new account rather than reactivating the account and also executes processes to obtain a balance remaining on a prepaid phone card, if any, cancel the prepaid phone card, and either refund the balance or transfer it to a new prepaid phone card with an account number generated in accordance with the account numbering scheme described above. Implementing such functionality may involve modifying one or more of the features of the exemplary embodiments disclosed herein.

In yet another embodiment, if the account number obtained from the customer indicates an inactive account for which there is an associated active account, processes giving the customer the option to transfer the remaining balance of the inactive account to the associated active account can be implemented. Implementing such functionality may involve modifying one or more of the features of the exemplary embodiments disclosed herein.

Figure 10:
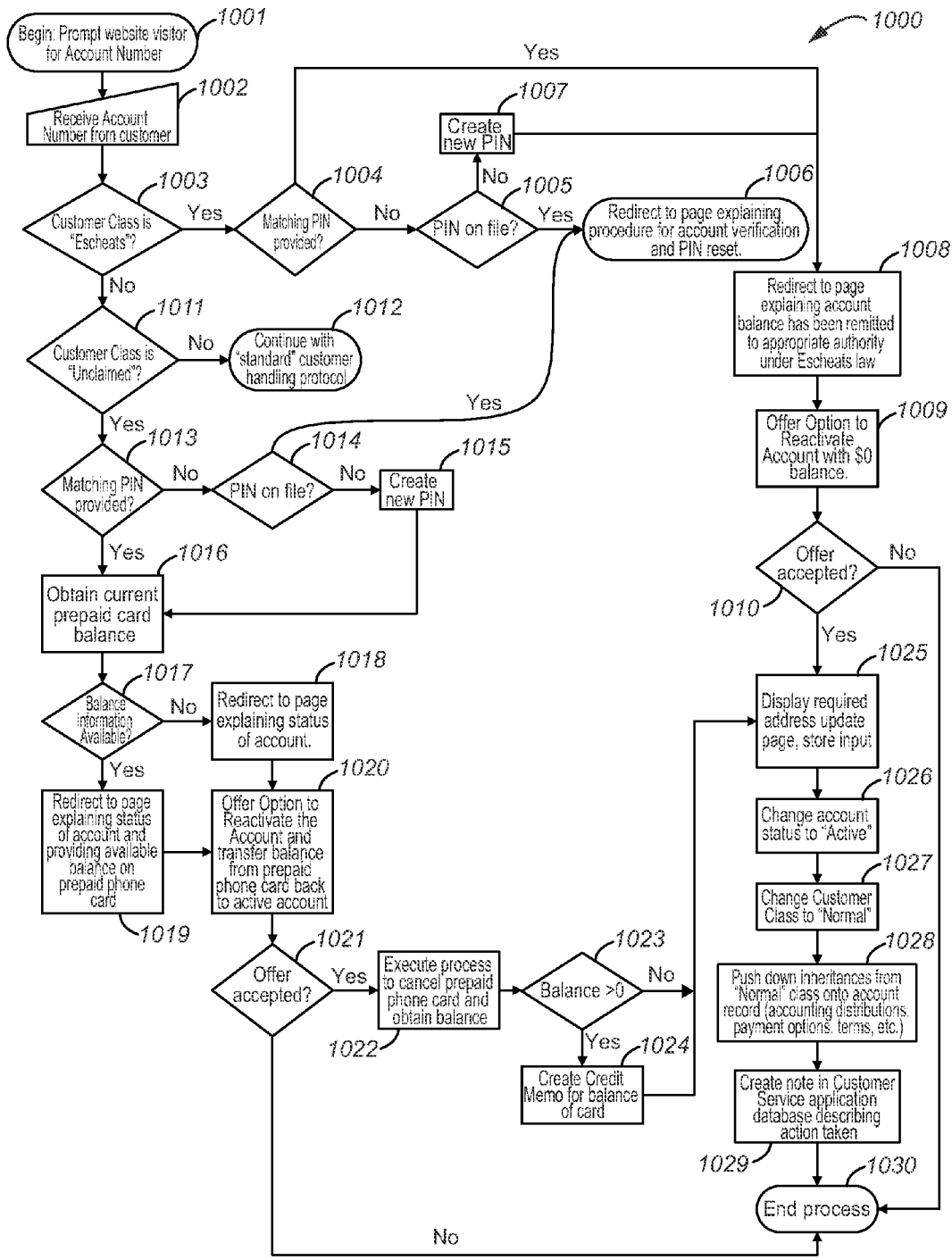
FIG. 10 is a flowchart illustrating functions performed by a Web-based Application For Accounts Other Than Inactive, Pending Treatment Action according to certain embodiments.

Web-Based Application for Inactive Accounts Other than Inactive Pending Treatment Action Process FIG. 10 illustrates the processes performed by Web-based Application For Inactive Accounts Other Than Inactive Pending Treatment Action Module 1000 in certain embodiments. Similarly to above-described modules, customers are given specialized handling based on their Customer Class, and while not illustrated in this example, additional classes beyond those shown could easily be added. The process according to some embodiments begins at box 1001 when a webs site visitor is prompted for an account number. The process receives an account number from the customer at box 1002 and determines at decision box 1003 whether the Customer Class is "Escheats." If so and if a matching PIN is provided at decision box 1004, then the process redirects the customer to a web page at box 908 explaining that the account balance has been remitted to the proper authority in accordance with escheats legal provisions. The process offers to reactivate the account with a zero balance at box 1009. If the customer declines at decision box 1010 then the call ends at box 1030, but if the customer accepts then processing proceeds to box 1025 to be described further below.

Returning to Decision box 1004, if a matching PIN is not provided but a PIN is determined at decision box 1005 to be on file, then at box 1006 the customer is redirected to a web page explaining the procedure for account verification and PIN reset. If at decision box 1005 a PIN is not on file, then a new PIN is created at box 1007 and processing proceeds to box 1008 as described above.

Returning to decision box 1003, if the Customer Class is not "Escheats" then the process determines at decision box 1011 if the Customer Class is "Unclaimed." If not, then processing continues with standard customer handling protocol at box 1012. If at decision box 1011 the Customer Class is "Unclaimed," but at decision box 1013 no matching PIN is provided, the process determines at decision box 1014 is a PIN is on file. If so, processing proceeds to box 1006 as described above. If at decision box 1014 no PIN is on file then a new PIN is created at box 1015 and processing proceeds to box 1016 and subsequent processing to be described below.

Returning to decision box 1013, if a matching PIN is provided, then at box 1016 the process obtains the current prepaid card balance. As with FIGS. 7, 8, and 9 the process of obtaining the balance can be iterated if the balance cannot be obtained on a given attempt due, for example, a system failure. If after a number of retries the account balance is not available due, for example, to a system failure, then the process redirects the user to an appropriate web page (not shown). If no balance information is available at decision box 1017, due, for example, to the nonexistence of such balance information for this customer record, then the process at box 918 redirects the customer to web page explaining the status of the account and proceeds to box 1020 and subsequent processing to be described below. If account balance information is available at decision box 1018, then at box 1019 the customer is redirected to a web page explaining the status of the account and providing the available balance on the prepaid phone card. At box 1020 the process then offers the customer the option to reactivate the account and transfer the balance from the prepaid card back to the active account or, if the balance it zero, to reactivate the account with zero balance. If this offer is not accepted at decision box 1021, then the call ends at box 1030. If at decision box 1021 the offer is accepted, then at box 1022 the process cancels the prepaid phone card. At decision box 1023 if the balance is greater than zero, then at box 1024 a Credit Memo for the balance of the card is created and processing proceeds to box 1025. If at decision box 1023 the balance is zero the process bypasses box 1024 and proceeds to box 1025, where the customer is prompted to update address information, which is subsequently stored with the account information. At box 1026, the account status is changed to "Active," at box 1027 the Customer Class is changed to "Normal," at box 1028 the inheritances from the Normal class are pushed down to the account, at box 1029 the actions taken are logged, and the call ends at box 1030.

In an alternative embodiment, if Customer Class is "Unclaimed," or "Escheats" the process proceeds to offer to create a new account rather than reactivating the account and also executes processes to obtain a balance remaining on a prepaid phone card, if any, cancel the prepaid phone card, and either refund the balance or transfer it to a new prepaid phone card with an account number generated in accordance with the account numbering scheme described above. Implementing such functionality may involve modifying one or more of the features of the exemplary embodiments disclosed herein.

In yet another embodiment, if the account number obtained from the customer indicates an inactive account for which there is an associated active account. In this embodiment, processes giving the customer the option to transfer the remaining balance of the inactive account to the associated active account can be implemented. Implementing such functionality may involve modifying one or more of the features of the exemplary embodiments disclosed herein.

The foregoing detailed description is to be understood as being in every respect illustrative and exemplary, but not restrictive, and the scope of the invention disclosed herein is not to be determined only from the detailed description of illustrative embodiments but according to the full breadth permitted by the patent laws. It is to be understood that the embodiments shown and described herein are only illustrative of the principles of the present invention and that various modifications may be implemented by those skilled in the art without departing from the scope and spirit of the invention.

GENERAL

Embodiments of the present disclosure may comprise systems having different architecture and methods having different information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

Some portions of the detailed description have been presented in terms of algorithms or processes which may take the form of a series of operations on data or signals stored in a computer memory. As a result, these operations take the form of manipulation or transformation of physical quantities. Such quantities may in some instances take the form of electrical or magnetic signals capable of being transformed, stored, retrieved, compared, combined or otherwise manipulated. It is to be understood that all such references to algorithms and processes also refer to the underlying physical quantities and their transformations and manipulations. Similarly, references herein to terms such as "computing," "processing," "determining," and similar terms refer to the actions of a computer or similar platform that transforms or otherwise manipulates data stored as physical quantities within the computer or platform.

Additional embodiments include a computer readable medium or media tangibly embodying program code for implementing one or more aspects of the present subject matter. As an example, embodiments can include media embodying program code executable by one or more processors of a computing system to cause the system to implement methods of treating, disposing, and/or restoring dormant accounts with one or more aspects of the present subject matter as noted herein.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

We claim:

1. An automated method of treating accounts, the method comprising:
    maintaining a database of customer account records;
    associating with a customer account record a customer class designation reflecting unclaimed treatment wherein
        the customer class designation of unclaimed indicates a length of time since last customer activity in the customer account exceeds an inactivity threshold;
    assigning to the customer account record a prepaid phone card account number comprising a phone account number and a sequence number, wherein the sequence number is changed each time the phone account number is assigned to a different customer account record;
    creating a file to authorize activation of a prepaid phone card authorizing phone usage charges in an amount equal to the account balance in the customer account record, wherein the prepaid phone card account number is associated with the prepaid phone card; and
    associating with the customer account record a customer status designation of inactive.

2. The method of claim 1 further comprising:
    associating with a second customer account record a customer class designation reflecting escheats treatment, wherein
        the customer class designation of escheats indicates an account balance in the second customer account record does not exceed a second balance threshold and a length of time since last customer activity in the customer account exceeds an applicable escheats parameter;
    designating an amount equal to the account balance in the customer record for remittance to an appropriate escheats authority; and
    changing a customer status designation in the customer account record to inactive.

3. The method of claim 1 further comprising generating the prepaid phone card.

4. The method of claim 1 wherein the customer class designation of unclaimed further indicates an account balance in the customer account record exceeds a balance threshold.

5. The method of claim 2 further comprising remitting the designated amount to the appropriate escheats authority.

6. A system for automatic treatment of accounts, the system comprising:
    a database of customer account records; and
    a computer facility coupled to the database of customer account records;
    wherein the computer facility is configured to
        scan the database for a customer account record;
        determine a length of time since last customer activity in the customer account associated with the customer account record;
        compare the length of time since last customer activity in the customer account with an inactivity threshold;
        if the length of time since last customer activity in the customer account exceeds the inactivity threshold then
            assign to the customer account record a prepaid phone card account number comprising a phone account number and a sequence number, wherein the sequence number is changed each time the phone account number is assigned to a different customer account record;

and
create a file comprising the account balance and the prepaid phone card account number for transmittal to the prepaid phone card facility.

7. The system of claim 6 wherein the computer facility is further configured to
determine an account balance associated with the customer account record;
compare the account balance with a balance threshold; and
create the file only if the length of time since last customer activity in the customer account exceeds the inactivity threshold and the account balance exceeds the balance threshold.

8. The system of claim 6 further comprising a prepaid phone card facility coupled to the computer processor wherein the prepaid phone card facility is configured to
receive the file created by the computer facility;
generate a prepaid phone card authorizing phone usage charges in an amount equal to the account balance; and
associate the prepaid phone card account number with the prepaid phone card.

9. The system of claim 6 wherein the computer facility is further configured to
scan the database for a second customer account record;
determine a second account balance associated with the second customer account record;
compare the second account balance with a second balance threshold;
determine a length of time since last customer activity in the customer account associated with the second customer account record;
compare the length of time since last customer activity in the customer account with an escheats parameter;
if the second account balance exceeds the second balance threshold and the length of time since last customer activity in the customer account exceeds the escheats parameter, then designating the second customer account record for remittance to an appropriate escheats authority.

* * * * *